Jan. 5, 1926. 1,568,082
W. E. MITTON
APPARATUS FOR LOADING TRAYS WITH CANS
Filed April 24, 1924 5 Sheets-Sheet 1

William E. Mitton
INVENTOR
BY Archibald Coy
his ATTORNEY

Jan. 5, 1926. 1,568,082
W. E. MITTON
APPARATUS FOR LOADING TRAYS WITH CANS
Filed April 24, 1924 5 Sheets-Sheet 2

William E. Mitton.
INVENTOR
BY Archibald Coy
his ATTORNEY

Jan. 5, 1926. 1,568,082
W. E. MITTON
APPARATUS FOR LOADING TRAYS WITH CANS
Filed April 24, 1924 5 Sheets-Sheet 3

Fig.3

William E. Mitton
INVENTOR
BY Archibald Cox
his ATTORNEY

Jan. 5, 1926.  1,568,082
W. E. MITTON
APPARATUS FOR LOADING TRAYS WITH CANS
Filed April 24, 1924   5 Sheets-Sheet 4

William E. Mitton
INVENTOR
BY Archibald Cox
his ATTORNEY

Patented Jan. 5, 1926.

1,568,082

UNITED STATES PATENT OFFICE.

WILLIAM E. MITTON, OF NEW LONDON, WISCONSIN, ASSIGNOR TO THE BORDEN COMPANY, OF NEW YORK, N. Y., A CORPORATION OF NEW JERSEY.

APPARATUS FOR LOADING TRAYS WITH CANS.

Application filed April 24, 1924. Serial No. 708,635.

*To all whom it may concern:*

Be it known that I, WILLIAM E. MITTON, a citizen of the United States, residing in New London, in the county of Waupaca, in the State of Wisconsin, have invented certain new and useful Improvements in Apparatus for Loading Trays with Cans, of which the following is a specification.

The invention relates to an improvement in apparatus for loading trays with cans and the like.

During the process of preserving milk and other foods in tin cans it is necessary, at one or more stages, to transport the filled and sealed cans from one point to another. To facilitate and expedite this transfer of the cans it has been found convenient to load them into portable trays which are carried to the point of delivery and then returned. The cans are usually brought to the point of loading into the portable trays on an endless belt or conveyor.

The object of the invention is to produce an improved apparatus for receiving the cans from the conveyor and transferring them to the portable trays. The apparatus is timed to operate synchronously with the travel of the conveyor carrying the supply of cans to be placed in the trays, so that there will be no interruption or delay in the continuous stream of cans passing from one point to another in the series of operations to which the cans are subjected in filling them with food, sealing them, sterilizing their contents and storing them away. In carrying out the object of the invention the cans are discharged from the conveyor onto a platform from which they are transferred to the portable trays. No cans are transferred from the platform to the trays until the requisite number of cans have been delivered to the platform. Thus a predetermined number of cans are always placed in the trays before they are carried away from the apparatus. The invention is more fully described hereinafter and is particularly pointed out in the claims.

In the accompanying drawings illustrating the preferred form of the invention, Fig. 1 is a side elevation of the improved apparatus for loading trays with cans and the like.

In the form of the invention shown in the drawings the cans to be transferred to the portable trays are carried to the apparatus four abreast on a continuously moving conveyor belt. The portable trays have a capacity of twenty-four cans (which is a convenient number to handle), and consequently the platform which receives the cans from the conveyor also has a capacity of twenty-four cans, four transversely and six longitudinally. The can receiving platform is movably mounted and the arrangement is such that when twenty-four cans have been properly placed on the platform, the latter is moved to such position that the cans may be loaded or transferred into a tray. Connected with the platform is a series of electrical contacts corresponding to the four rows of cans. These contacts are in an electric circuit which controls the operation of the apparatus as a whole, and the circuit is not closed until the twenty-four cans are properly on the platform. When the platform has received the requisite number of cans and the circuit is thereby closed the feed of the cans into the apparatus is temporarily stopped, the tray to receive the cans on the platform is released to receive the cans, the platform is moved in position to discharge the cans into the tray, and an arm is operated to push the cans from the platform into the tray and by that operation push the next preceding filled tray out of the apparatus. Upon the completion of this series of operations, the parts return to normal position, thereby permitting the conveyor to push a fresh supply of twenty-four cans onto the platform. During these movements an empty tray is brought into position under the platform and held until the platform is moved into discharging position.

More particularly the improved apparatus for loading portable trays with cans and the like comprises the platform 15 for receiving the cans 16 from the endless conveyor belt 17, the forward end of which passes over the pulley 18 mounted on the shaft 19 journaled in the frame work 20, the other end of the conveyor not being indicated in the drawings. The platform 15 is rectangular in plan and is located beyond the discharge end of the conveyor 17 with its longitudinal axis arranged parallel with the direction of travel of the conveyor. Between the platform and the conveyor is a table or shelf 21 which is secured to the uprights or standards 22 of the main part of the apparatus and serves as a support on which the cans are held while those on the platform are being transferred into the tray. The cans are pushed onto the platform four abreast and are discharged over one side thereof six abreast. For this purpose the platform is mounted along one side on a bar 24 rigidly secured to a shaft 25 pivotally mounted in the standards 22. The platform is tilted by means of an arm 26 (Fig. 1) secured to one end of the shaft 25. The free end of the arm 26 is pivotally connected by means of the link 27 with one end of a lever 28 pivoted at 29 in the frame of the apparatus. The other end of the lever 28 carries a roll 30 arranged to engage the periphery of a cam 32 mounted on a cam shaft 33 journaled at 34 on the upper ends of the standards 22.

The cam shaft 33 is driven from a motor 35 supported on the frame 20. The connections between the motor and the cam shaft comprise a pinion 36 mounted on the motor shaft 37 and meshing with a gear 38 mounted on one end of a shaft 39 journaled in the block 40 supported on the motor. The other end of the shaft 39 is provided with a pinion 41 which meshes with a gear 42 loosely mounted on one end of the shaft 33. When the twenty-four cans have been properly placed on the receiving platform 15, the clutch section 44 slidingly keyed on the cam shaft 33 is moved (as will be presently explained) into engagement with the clutch section 45 fixed to the gear 42, and the shaft 33 is thereby rotated with the result that the cans on the platform 15 are transferred to a tray.

The mechanism for determining whether twenty-four cans have been properly placed on the platform 15 comprises a series of levers 47 pivoted at 48 in a guide bar 49 (supported at its ends in the standards 22) and arranged to be received in recesses 46 formed in the rear side of the bar 49. There are four levers 47, each opposite a corresponding row of cans. In order that the foremost can in each row may positively engage its lever 70 and so bring about the operation of the machine, the cans are guided onto the platform by means of the guide strips 50 depending transversely from the under surface of a guide plate 52 pivoted at 53 to brackets 54 secured to the standards 22. The left hand row of cans (viewing Figs. 1 and 4) is guided by the downturned edge 55 of the plate 52 and the right hand row of cans is guided by the bar 24.

Figures 5, 6, 7:
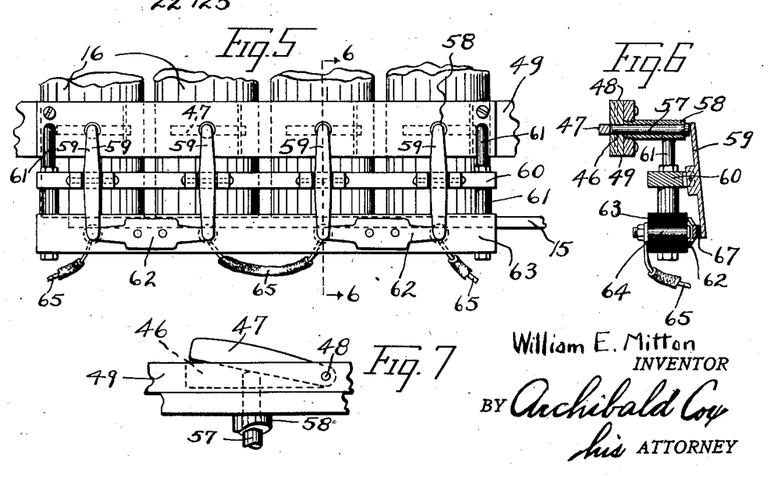
Fig. 5 is an enlarged detail of the circuit devices for controlling the transfer of the cans from the platform into the portable trays.
Fig. 6 is a section taken along the line 6—6 of Fig. 5.
Fig. 7 is a plan of one of the electric contact controlling levers.

Opposite the free end of each lever 47 is located a pin 57 (Fig. 7) mounted to slide in a sleeve 58 threaded into the guide bar 49. In spring-pressed contact with the head of each pin 57 is a lever 59 pivoted in the rod 60 secured by the studs 61 to the guide bar 49. The lower ends of the levers 59 are pressed outwardly (to hold the upper ends in engagement with the pins 57) by means of the outer ends of the contact springs 62 secured to a bar 63 of insulating material supported from the lower ends of the studs 61. Discs 67 of insulating material are interposed between the contact springs 62 and the levers 59. Located opposite the outer ends of the contact springs 62 are the contact pins 64 connected with the wire sections 65. As the foremost can of each row of cans is pushed against the free end of its lever 47 by the succeeding cans, the outward movement of the pins 57 causes the lower ends of the levers 59 to move inwardly and press the ends of the contact springs 62 against the pins 64 thereby closing the circuit through the wire 65. It will be seen that this arrangement is such that the circuit through the wire 65 is not completely closed until the first can in each row is in engagement with its lever 47, that is, the circuit is not closed unless all the twenty-four cans (or any other predetermined number) are in proper position on the platform 15.

Figures 8, 9, 10:
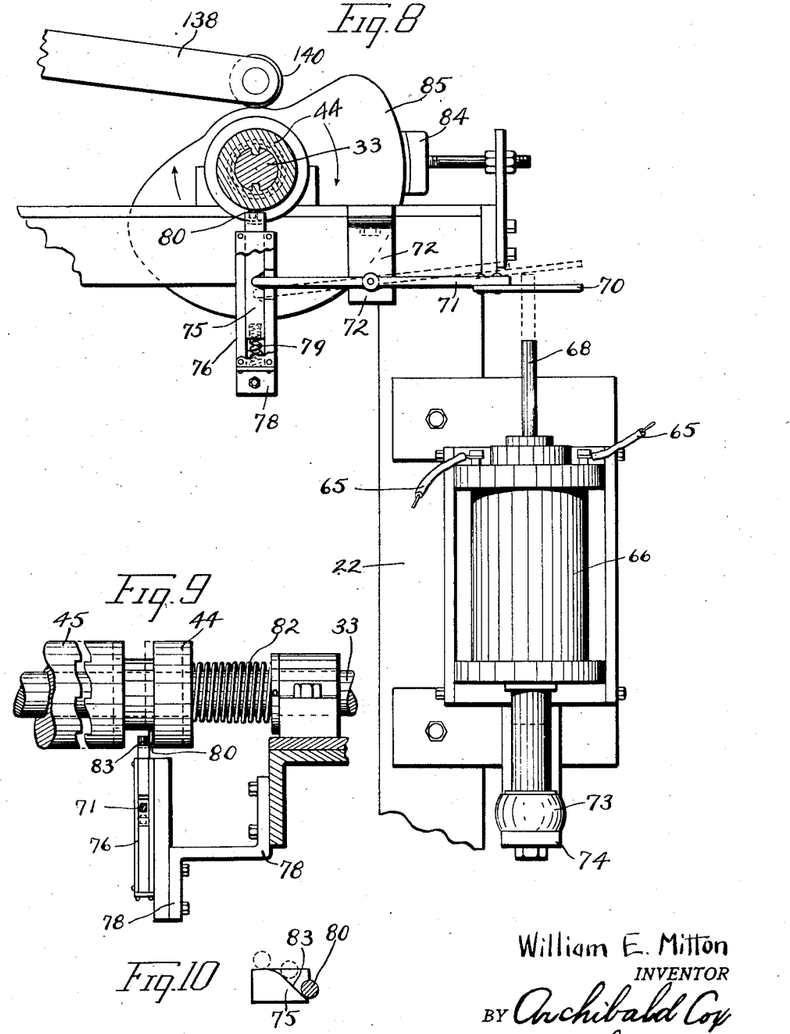
Fig. 8 is an enlarged elevation, partly in section, of the solenoid controlled clutch.
Fig. 9 is a detail of a part of the clutch mechanism looking from the right in Fig. 8.
Fig. 10 is an enlarged plan of the end of the slide bar for disengaging the clutch, showing the various positions of the pin connected with the clutch during the action of disengagement.

The closing of the circuit through the wire 65 energizes a solenoid 66 supported from one of the standards 22, and causes the armature 68 to rise, as shown in Fig. 8, and strike the plate 70 secured to the outer end of a lever 71 pivoted to a bracket 72 secured to the frame of the apparatus. Upon the deenergization of the solenoid 66 by the breaking of the circuit through the wire 65 by the spring contacts 62, the armature 68 drops onto the cushion 73 supported on the bracket 74. When the upper end of the armature 68 raises the outer end of the lever 71, it depresses the inner end of the lever which is loosely engaged in a slide bar 75, adapted to slide in a vertically arranged guide box 76 secured to the bracket 78. The slide bar 75 is normally pressed upwardly by means of the expansion spring 79 into the path of rotation of a pin 80 fixed in the sliding clutch section 44 to thereby keep the teeth of the clutch section 44 out of engagement with the teeth of the clutch section 45.

The depression of the inner end of the lever 71 by the upward movement of the armature 68 when the circuit through the wire 65 is closed disengages the upper end of the slide bar 75 from the pin 80 and permits the expansion spring 82 to force the clutch section 44 into engagement with the clutch section 45 and thereby cause the actuation of the various parts of the apparatus from the rotation of the cam shaft 33. When the cans have been discharged from the platform 15, the springs 62 are thereby permitted to become disengaged from the pins 64; the circuit through the wire 65 is broken and the armature 68 drops to its inoperative position. Thereupon the spring 79 acts to push the upper end of the slide bar 75 into the path of rotation of the pin 80. It will be seen by Fig. 10 that the upper end of the slide bar 75 is provided with a cam surface 83. As the pin 80 rotates it strikes the cam surface 83 and the clutch section 44 is thereby disengaged from the clutch section 45. This results in a substantially instantaneous stopping of the apparatus by reason of the action of the brake 84 (supported from the standard 22) against the periphery of the cam 85 mounted on the cam shaft 33.

Figure 4:
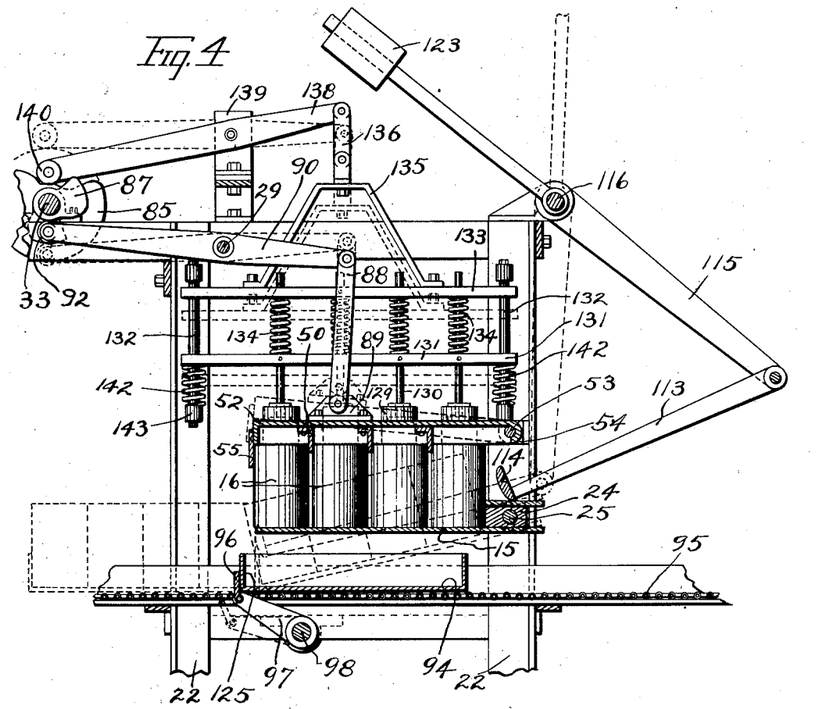
Fig. 4 is an enlarged section taken on line 4—4 of Fig. 2.

In order that the guide plate or cover 52 with its guide strips 50 and 55 may not interfere with the discharge of the cams from the platform 15 when the latter is tilted, the forward or free end of the plate 52 is lifted, as shown in Fig. 4, by the action of the cam 87 mounted on the cam shaft 33. The connections between the cam 87 and the plate 52 comprise a link 88 pivoted at its lower end to an angle iron 89, secured to the top of the plate 52, and at its upper end to one end of a lever 90 pivoted at 29. The other end of the lever 90 carries a cam roll 92 in engagement with the periphery of the cam 87. The plate 52 tends to descend by gravity and so hold the roll 92 against the cam 87. When the active part of the cam 87 is carried by the rotation of the shaft 33 against the roll 92 the plate 52 is lifted to remove the guides 55 and 50 out of the path of travel of the cans.

Figure 1:
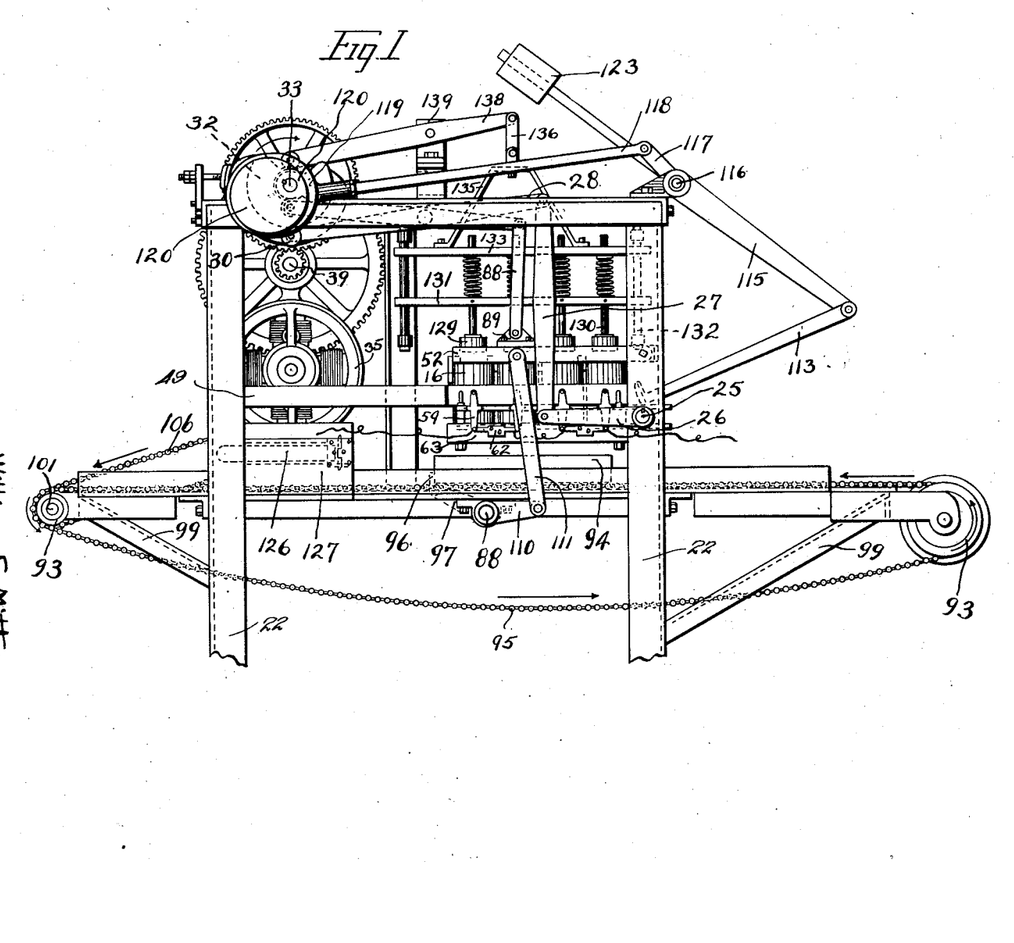
Figure 2:
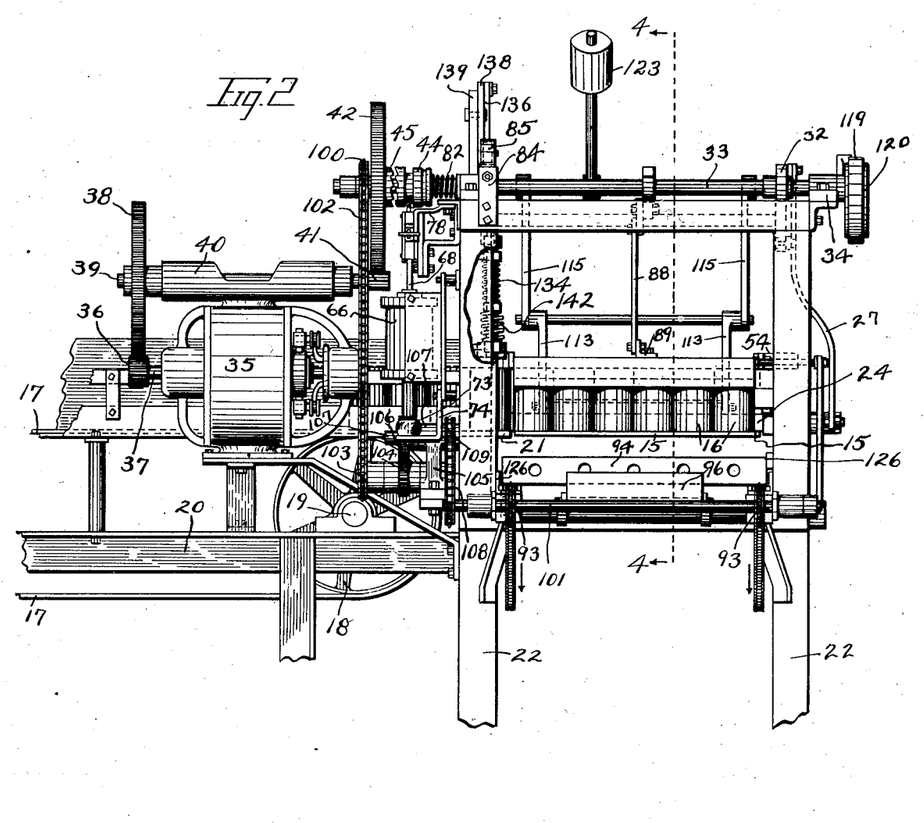
Fig. 2 is an elevation of one end of the apparatus shown in Fig. 1, looking from the left.
Figure 3:
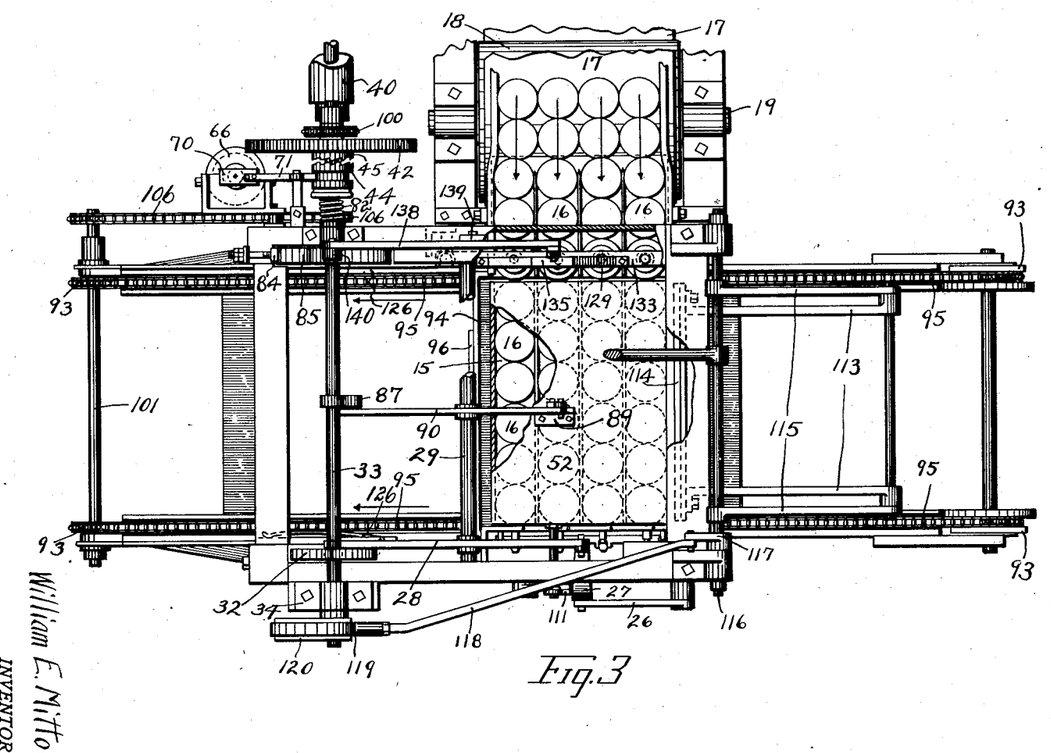
Fig. 3 is a plan of the apparatus.

Substantially simultaneously with the rise of the plate 52 the platform 15 is tilted into the position shown by dotted lines in Fig. 4. This causes the forward or free end of the platform to descend into the tray 94 which has been carried by the conveyor chain 95 into position under the platform and which is temporarily held in that position by means of the movable stop 96 secured to the free end of the arm 97 mounted on the shaft 98. The conveyor chain 95 carries the empty trays 94 forward by frictional engagement therewith so that when a tray encounters the stop 96 it is held thereby while the conveyor chain 95 continues its forward movement. The conveyor chain is mounted on sprocket wheels 93 supported from brackets 99 at the forward and rear ends of the apparatus, as shown in Fig. 1. The conveyor chain is driven from the sprocket wheel 100 (Fig. 2) secured to the gear 42. The connections between the sprocket wheel 100 and the shaft 101 at the forward end of the conveyor chain comprise a chain 102, the lower end of which passes over a sprocket 103 mounted on the outer end of a shaft on which the gear 104 is mounted, the shaft being journaled in a bracket 105 supported from the standard 22. The gear 104 meshes with a gear 106 mounted on the outer end of a shaft 107 journaled in the bracket 105. On the inner end of the shaft 107 is a sprocket 109 connected by the chain 108 with the shaft 101.

As the plate 52 rises and the platform 15 decends, the stop 96 is removed from in front of the tray 94 so as to permit the tray to be carried forward with the cans when they are discharged from the platform. The arm 97 on which the stop 96 is mounted is connected with the guide plate 52 by means of the arm 110 and the link 111. The arrangement is such that when the plate 52 rises the stop 96 descends out of the path of travel of the tray; and when the plate 52 descends into normal position, the stop 96 rises to hold the next succeeding tray on the chain in position under the platform.

The means for discharging the cans from the platform and transferring them into the tray comprises pusher arms 113 having a transversely arranged head 114 adapted to engage the cans and push them off the platform into the tray beneath. The arms 113 are pivotally connected with the lower ends of the arms 115 secured to a shaft 116, to which the arm 117 is also secured, thereby forming a bell crank. The arm 117 is pivotally connected with the eccentric rod 118 adjustably secured to the eccentric strap 119 which embraces an eccentric 120 mounted on the cam shaft 33. Secured to shaft 116 is a counterweight 123. As the forward end of the platform 15 descends into the empty tray 94, the eccentric 120 operates to cause the pusher head 114 to sweep the cans off the platform and into the tray. As the pusher head 114 sweeps over the platform 15, the first row of cans engage with the inner side of the front wall 125 of the tray 94 and push the tray forward with them so that the succeeding rows of cans will fall into place in the tray, which action will be clearly understood by reference to the dotted lines in Fig. 4. The forward travel of tray 94 under the action of the pusher 114 carries the tray of cans between the frictional holding devices 126 mounted as leaf springs on vertically arranged plates 127. The filled tray is held by the holding devices 126 until it is ejected therefrom by the next succeeding tray of cans under the action of the pusher. The tray of cans between the holding devices thus acts as a frictional stop against which the tray receiving the cans is pushed. The mode of operation of this arrangement is such that it is assured that the rearmost row of cans will properly drop into place in the tray being filled.

When twenty-four cans have been pushed onto the platform 15 by the conveyor belt 17 and the apparatus is thereby caused to function, the feed of the cans from the conveyor 17 onto the platform 15 is temporarily stopped while the twenty-four cans on the platform are being transferred into their tray. The means for holding back the cans being pushed forward by the conveyor belt 17 comprises a series of plunger heads 129 mounted on the lower ends of vertically arranged rods 130 which pass through a cross bar 131 and are pinned thereto. The ends of the cross bar 131 are slidingly mounted on the vertically arranged rods 132 secured on the standards 22, by the studs 143. The upper ends of the rods 130 pass loosely through a second cross bar 133, the ends of which slide on the rods 132. Surrounding each rod 130 and interposed between the cross bars 131 and 133 is a compression spring 134. Secured to the bar 133 is a yoke 135 pivotally connected by a link 136 with one end of a lever 138 pivotally mounted on a bracket 139 rising from the frame of the apparatus. The other end of the lever 138 carries a cam roll 140 in engagement with the periphery of cam 85. When the predetermined number of cans have been pushed onto the platform by the conveyor and the circuit through the wire 65 has been thereby closed and the shaft 33 started in rotation, the cam 85 causes the plunger heads 129 to descend upon the foremost row of cans on the shelf 21 and thereby prevent any more cans from being pushed onto the platform while those already on the platform are being removed therefrom and placed in the tray beneath. The connections between the plunger heads 129 and the cross bars 131 and 133 result in the plunger heads being yieldingly pressed against the tops of the cans. When the cans have been discharged from the platform and it has again risen to its horizontal position, the inactive or depressed part of cam 85 moves opposite cam roll 140, and thereupon the springs 142 interposed between the outer ends of the cross bar 131 and the lower studs 143 force the parts connected with the plunger heads 129 upwardly into normal position, thereby permitting the cans on the intermediate platform 21 to be pushed onto the platform 15 by the cans on the conveyor.

The mode of operation of the apparatus may be briefly recapitulated as follows:—
The cans to be placed in the portable trays and carried forward in a continuous line, four abreast, and pushed over the shelf 21 onto the tilting platform 15, the guide strips 50 and 55 and the block 24 acting to properly direct the foremost can in each row against a lever 47. In the mean time, the conveyor chain 95 has acted to carry forward a tray and position it beneath the platform and against the movable stop 96. When six cans in each row have been pushed onto the platform, the first can in each row presses the corresponding lever 47 into the slot 46 against the sliding pin 57, thereby rocking the levers 59 so as to force the outer ends of the contact springs 62 against the pins 64 and close the circuit through the solenoid 66. Thereupon the armature 68 rises and swings the lever 71 so as to disengage the slide 75 from the pin 80 to permit the spring 82 to force the clutch section 44 into engagement with the clutch section 45, and thereby set in operation the various means for transferring the cans from the platform into the tray 94. The feed of the cans from the conveyor onto the platform is temporarily halted by the descent of the plunger heads 129 on the foremost row of cans on the shelf 21. At about the same time the platform 15 is tilted on its axis and the guide plate 52 is raised. As the guide plate 52 rises the stop 96 is depressed to release the tray, and then the pusher head 114 is moved longitudinally of the platform 15, and sweeps the cans off the platform into the tray, at the same time moving the tray forward so that all the cans will be properly deposited therein. As the filled tray is pushed forward by the pusher 114, it encounters the next preceding filled tray held by the friction devices 126 and pushes it forward disengaging it from the holding devices, so as to permit the workman to remove it. The pusher head 114 then retreats leaving the freshly filled tray between the holding devices 126. The retarding action of the filled tray in the holding devices upon the tray being filled and pushed forward by the pusher 114 aids in the proper deposition of the last row of cans in the tray. As the pusher 114 retreats, the platform 15 returns to its normal horizontal position and the guide plate 52 descends to guide the waiting cans (which have now been released by the lifting of the plunger heads 129) onto the platform and against the levers 47. As the guide plate 52 descends into normal position, the stop 96 is raised to catch and hold the next succeeding tray on the conveyor chain 95.

Having thus described the invention what I claim as new is:—

1. An apparatus for loading trays with cans and the like comprising, a platform for receiving the cans to be transferred to the tray, means for moving the platform into position so that the cans may be transferred therefrom into the tray, means for removing the cans from the platform and placing them in the tray, actuating means, a solenoid for controlling the operation of the actuating means, said solenoid being in a normally open circuit which is closed when the predetermined number of cans are properly positioned on the platform, and means adapted to be engaged by the cans when a predetermined number are on the platform for closing the circuit.

2. An apparatus for loading trays with cans and the like comprising a platform from which the cans are transferred to the tray, means for placing a predetermined number of cans on the platform, means for moving the platform into position so that the cans may be removed therefrom, means for removing the cans from the platform and placing them in the tray, and means for preventing the movement of the platform and the removal of the cans therefrom until the predetermined number of cans are on the platform.

3. An apparatus for loading trays with cans and the like comprising, a platform movable to one position to receive the cans, means for placing a predetermined number of cans on the platform, means for bringing a tray into position to receive the cans from the platform, means for moving the platform to another position so that the cans may be removed therefrom, means for removing the cans from the platform and placing them in the tray, and means for preventing the transfer of the cans from the platform to the tray until a predetermined number of cans are on the platform.

4. An apparatus for loading trays with cans and the like comprising, a pivotally mounted platform, means for placing a predetermined number of cans on the platform, means for bringing a tray into position under the platform, means for tilting the platform to bring the free end thereof into the tray, means for pushing the cans off the platform into the tray, and means for preventing the operation of the apparatus until the predetermined number of cans have been placed on the platform.

5. An apparatus for loading trays with cans and the like comprising, a platform pivotally mounted at one end, means for placing a predetermined number of cans on the platform, means for placing a tray beneath the free end of the platform, means for tilting the platform to bring the free end thereof into the tray, and means for pushing the cans from the platform into the tray.

6. An apparatus for loading trays with cans and the like comprising, a platform pivotally mounted at one end, means for placing a predetermined number of cans on the platform, a conveyor for frictionally carrying forward a tray to receive the cans, means for temporarily holding the tray under the free end of the platform, means for tilting the platform to bring the free end thereof into the tray, means for releasing the tray, and means for pushing the cans off the platform into the tray, said pushing means acting to move the tray forward as it places the cans therein.

7. An apparatus for loading trays with cans and the like comprising, a platform pivotally mounted at one end, means for placing a predetermined number of cans on the platform, a conveyor for frictionally carrying forward a tray to receive the cans, means for temporarily holding the tray in position under the free end of the platform, means for tilting the platform toward the tray, means for releasing the tray, means for pushing the cans off the platform into the tray, and frictional holding devices in the path of travel of the filled tray, said pushing means acting to carry the tray with the cans therein between the holding devices.

8. An apparatus for loading trays with cans and the like comprising, a pivotally mounted platform, means for placing the cans to be transferred to the tray on the platform, a conveyor for carrying forward a tray, means for holding the tray in position to receive the cans, means for tilting the platform so that the cans may be transferred into the tray, means for releasing the tray, and means for removing the cans from the platform and placing them in the tray.

9. An apparatus for loading trays with cans and the like comprising, a platform, means for placing on the platform the cans to be transferred to the tray, a conveyor for carrying forward a tray to receive the cans, means for holding the tray in position to receive the cans, means for releasing the tray, and means for moving the tray forward by pushing the cans from the platform into the tray.

10. An apparatus for loading trays with cans and the like comprising, a pivotally mounted platform for receiving the cans to be transferred to the tray, means for holding a tray in position under the platform to receive the cans therefrom, means for tilting the platform, means for releasing the tray, and means acting longitudinally of the platform for removing the cans from the platform and pushing them into the tray, said pushing means acting to carry the tray forward as it deposits the cans therein.

11. An apparatus for loading trays with cans and the like comprising, means for conveying the cans to be transferred to the trays into the apparatus, pivotally mounted means for receiving a predetermined number of cans from the conveying means, means for holding a tray in position under the receiving means, means for tilting the receiving means, means for transferring the cans from the receiving means into the tray, and means for preventing the operation of the apparatus until a predetermined number of cans have been placed on the receiving means.

12. An apparatus for loading trays with cans and the like comprising, a movable platform, a conveyor for carrying forward a series of cans and pushing them onto the platform, means for placing a tray under the platform to receive the cans, means for moving the platform so that the cans may be removed therefrom, means for transferring the cans from the platform into the tray, solenoid controlled means for actuating the transferring means, a solenoid, and contact devices arranged to close the circuit through the solenoid when a predetermined number of cans have been placed on the platform and the contact devices are engaged thereby.

13. An apparatus for loading trays with cans and the like comprising, a pivotally mounted platform, a conveyor for carrying forward a series of cans and pushing them onto the platform, means for placing a tray under the platform to receive the cans, means for tilting the platform, means for removing the cans from the platform and placing them in a tray, solenoid controlled means for actuating the moving parts of the apparatus, a solenoid and contact devices in the circuit through the solenoid arranged to close the circuit when a predetermined number of cans have been placed on the platform and the contact devices have been engaged thereby.

14. An apparatus for loading trays with cans and the like comprising, a movable platform, a conveyor for carrying forward a series of cans and pushing them onto the platform, means for guiding the cans into separate rows on the platform, means for placing a tray in position to receive the cans from the platform, means for moving the platform and the guides to permit the cans to be transferred into the tray, means for removing the cans from the platform and placing them in the tray, solenoid controlled means for actuating the movable parts of the apparatus, a solenoid in a normally open circuit, a series of contact devices for closing the circuit through the solenoid, and a series of levers, each of which is opposite a row of cans for operating the contact devices to close the circuit when each lever is engaged by the first can in each row.

15. An apparatus for loading trays with cans and the like comprising, a platform, a shelf, a conveyor for carrying forward a series of cans and pushing them over the shelf and onto the platform, means for holding a tray in position under the platform, means for transferring the cans from the platform into the tray, and means disposed above the shelf and arranged to descend upon a row of cans on the shelf to hold back the line of cans on the conveyor while the cans on the platform are being transferred to the tray.

16. An apparatus for loading trays with cans and the like comprising, a movable platform, a conveyor for pushing a predetermined number of cans onto the platform, means for holding a tray under the platform, solenoid controlled means for actuating the movable parts of the apparatus, a solenoid in a normally open circuit, means for closing the circuit when the predetermined number of cans have been properly positioned on the platform, said actuating means being thereby caused to actuate: means for holding back the line of cans from the conveyor, means for moving the platform into position to discharge the cans into the tray, means for releasing the tray, and means for pushing the cans from the platform into the tray.

17. An apparatus for loading trays with cans and the like comprising, a movable platform, means for conveying a predetermined number of cans onto the platform, means for placing a tray under the platform, means for moving the platform so that the cans may be removed therefrom into the tray, and means for pushing and thereby causing the cans to slide off the platform and into the tray.

18. An apparatus for loading trays with cans and the like comprising, a platform pivoted at one side, a conveyor for pushing a series of cans onto the platform over one end thereof, means for tilting the platform to bring the free end thereof into a tray, and means acting transversely of the platform for pushing the cans from the platform into the tray.

19. An apparatus for loading trays with cans and the like comprising, a platform pivoted at one side, a plate pivoted at one side above the platform, said plate having guides depending therefrom toward the platform, a conveyor for pushing forward a series of cans onto the platform, said guides acting to separate the cans into rows, means for tilting the free side of the platform downwardly, means for tilting the free end of the plate upwardly to disengage the guides from the cans, and means for pushing the cans off the platform into a tray.

20. An apparatus for loading trays with cans and the like comprising, a movable platform, a movable guide plate located above the platform and having guides to direct the cans onto the platform, a conveyor for carrying forward a series of cans and pushing them onto the platform, means for placing and temporarily holding a tray under the platform, means for moving the platform and guide plate to permit the cans to be discharged therefrom, means for releasing the tray, means for removing the cans from the platform and depositing them in the tray, means for determining whether a predetermined number of cans have been placed on the platform, and actuating means, said actuating means remaining inoperative until the predetermined number of cans have been placed on the platform.

WILLIAM E. MITTON.